United States Patent [19]

Hansen et al.

[11] Patent Number: 4,813,477

[45] Date of Patent: Mar. 21, 1989

[54] HEAT EXCHANGER-FILTER APPARATUS FOR HYDROSTATIC SYSTEM

[76] Inventors: David W. Hansen, 15905 NE. 31st Ave., Ridgefield, Wash. 98642; James R. Walker, Shivley Creek Rd., Canyonville, Oreg. 97417

[21] Appl. No.: 9,164

[22] Filed: Jan. 30, 1987

[51] Int. Cl.[4] ...................... G05D 23/00; F16L 55/04; F28F 13/12; F28F 19/00

[52] U.S. Cl. ........................................ 165/32; 165/47; 165/119; 165/916; 165/917; 138/30; 220/85 B; 184/104.1

[58] Field of Search ...................... 165/47, 119, 83, 32, 165/73, 916, 917; 184/104.1, 104.2, 104.3; 138/30; 417/79; 220/85 B

[56] References Cited

U.S. PATENT DOCUMENTS

| | | | |
|---|---|---|---|
| 2,476,405 | 7/1949 | Dilworth | 165/119 |
| 3,693,825 | 9/1972 | Richman | 220/85 B |
| 3,762,467 | 10/1973 | Poon et al. | 165/119 |
| 3,935,882 | 2/1976 | Matthews | 138/30 |
| 4,064,911 | 12/1977 | Albrecht | 138/30 |
| 4,074,752 | 2/1978 | Schlosberg | 165/104.32 |
| 4,452,275 | 6/1984 | Sugimura | 138/30 |
| 4,662,435 | 5/1987 | Bohlin | 165/916 |
| 4,669,533 | 6/1987 | Hehl | 165/119 |

FOREIGN PATENT DOCUMENTS

| | | | |
|---|---|---|---|
| 219749 | 6/1942 | Czechoslovakia | 165/916 |
| 0107887 | 8/1980 | Japan | 165/917 |
| 0853315 | 8/1981 | U.S.S.R. | 165/119 |

*Primary Examiner*—Albert W. Davis, Jr.
*Assistant Examiner*—John K. Ford
*Attorney, Agent, or Firm*—Townsend and Townsend

[57] ABSTRACT

Apparatus including an expandable bellows having a pair of end plates, one plate being provided with a fluid inlet and the other plate being provided with a fluid outlet. A diffuser and filter is located within the bellows across the fluid path between the inlet and outlet. Thus, fluid at an elevated temperature entering the bellows must flow first through the diffuser, then through the filter before leaving the space within the bellows. In this way, the fluid is filtered before passing to and through the outlet. The expansion capability of the bellows provides a heat exchange relation between the fluid and the bellows itself. A pressure relief cap can be coupled to an outlet port communicating with the interior of the bellows. The inlet is adapted to be coupled to the waste line of a fluid pump of a hydrostatic system and the outlet is adapted to be coupled to the supply line of the fluid pump.

8 Claims, 2 Drawing Sheets

HEAT EXCHANGER-FILTER APPARATUS FOR HYDROSTATIC SYSTEM

Figure 1:
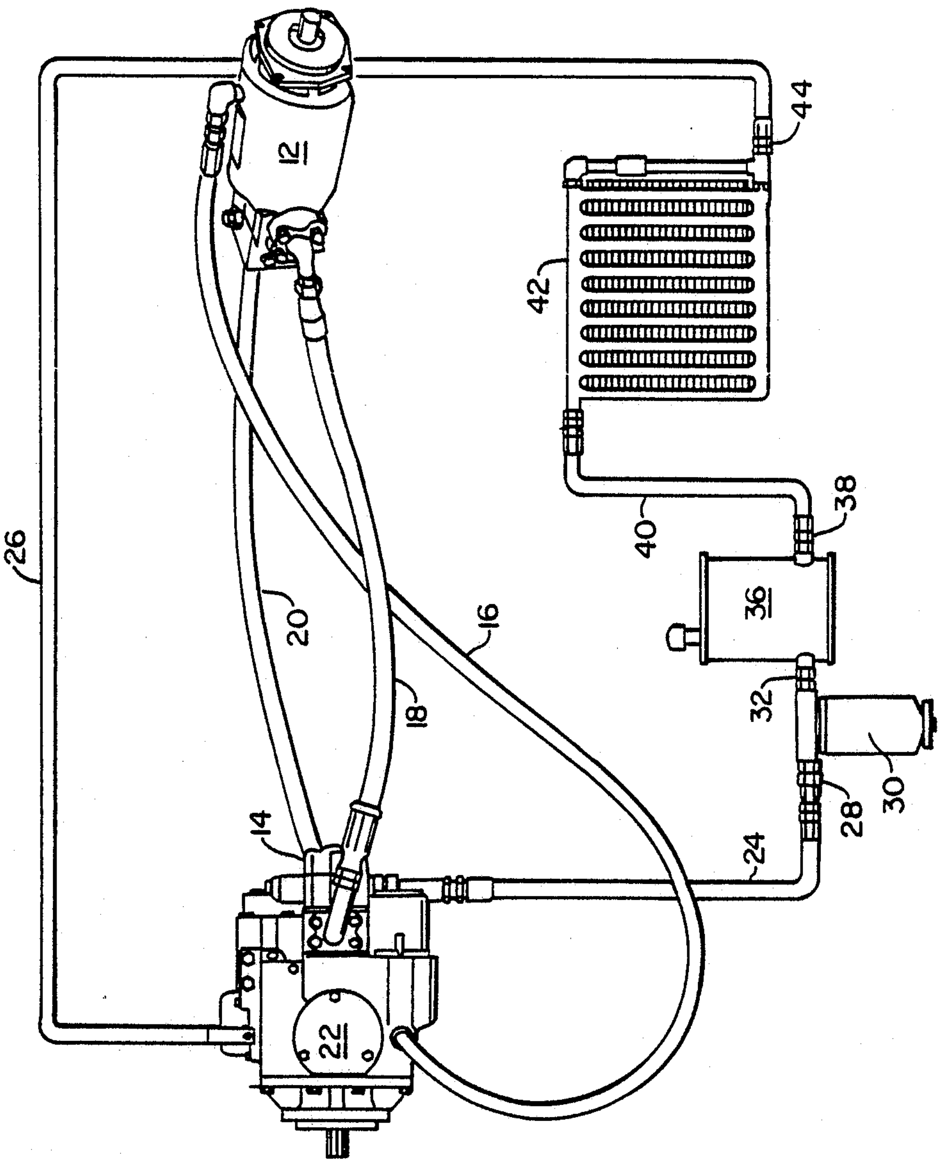
FIG. 1. PRIOR ART

This invention relates to improvements in the operation of hydrostatic systems and, more particularly, to an apparatus which serves both as a heat exchanger and a filter for a hydrostatic system using a hydraulic motor operated by a fluid pump.

BACKGROUND OF THE INVENTION

In the repair of hydraulic components of a hydrostatic system, it is often necessary to clean the components of such a system because of contamination from dirt and water. Typically, a system of this type includes a fluid reservoir, and a source of contamination of the system is the air vent on the reservoir itself. This vent allows dirt and water to enter the system and mix with the hydraulic fluid in the reservoir, thereby contaminating the fluid and requiring the fluid to be filtered to a major extent to prevent breakdown of the system because of contamination. Thus, because of this contamination problem, a need has continued to exist for some time for improvements in the handling of hydraulic fluids for driving hydraulic motors and other components of a hydrostatic system so that such fluids will not become contaminated and thereby require frequent repair and cleaning so as to minimize interruptions in the operation of the system. The present invention satisfies this need.

SUMMARY OF THE INVENTION

The present invention is directed to an apparatus which combines fluid filtering, sealed reservoir and fluid heat exchange components in a single unit. To this end, the apparatus of the present invention includes an expandable bellows having an interior, closed space for receiving a hydraulic fluid. An inlet and an outlet for the space allows entry of fluid into an exit of fluid out of the space within the bellows. A diffuser within the bellows is coupled across the inlet and to disburse the fluid to convolutes for heat exchange and to break up channeling of the oil so that the fluid entering the space within the bellows must first pass through the diffuser before it can go through the filter and leave the space through the outlet. As hydraulic fluid enters the bellows, the bellows expand due to the fluid expanding from increased temperature, thereby causing the bellows to serve as a heat exchanger as well as a reservoir for containing the fluid and causing the fluid to pass through the filter on its way out of the space through the outlet.

The apparatus of the present invention provides a sealed hydraulic system which prevents contamination of the type caused by the prior art system described above. Thus, the apparatus of the present invention has the capability to be completely full of oil and can expand and retract due to temperature changes so that the filter cap on the top of the end plate on the bellow provides a valve assembly which maintains a preset pressure in the reservoir and allows air introduction immediately when pressure falls below atmospheric. The valve assembly is surrounded by a filter element which ensures that any air drawn in is clean. The bellows can be provided with one or more end plates which can be separated from the bellows to replace the filter, if desired or deemed necessary.

The primary object of this invention is to provide an improved heat exchanger-filter apparatus for use with a hydraulic system employing a hydraulic motor wherein the apparatus is simple and rugged in construction, presents a sealed hydraulic system, and is operable not only to serve as a reservoir for hydraulic fluid but also to filter the hydraulic fluid and to serve as a heat exchanger therefor, all of which can be accomplished with a minimum number of parts.

Other objects of this invention will become apparent as the following specification progresses, reference being had to the accompanying drawings for an illustration of the invention.

IN THE DRAWINGS

Figure 2:
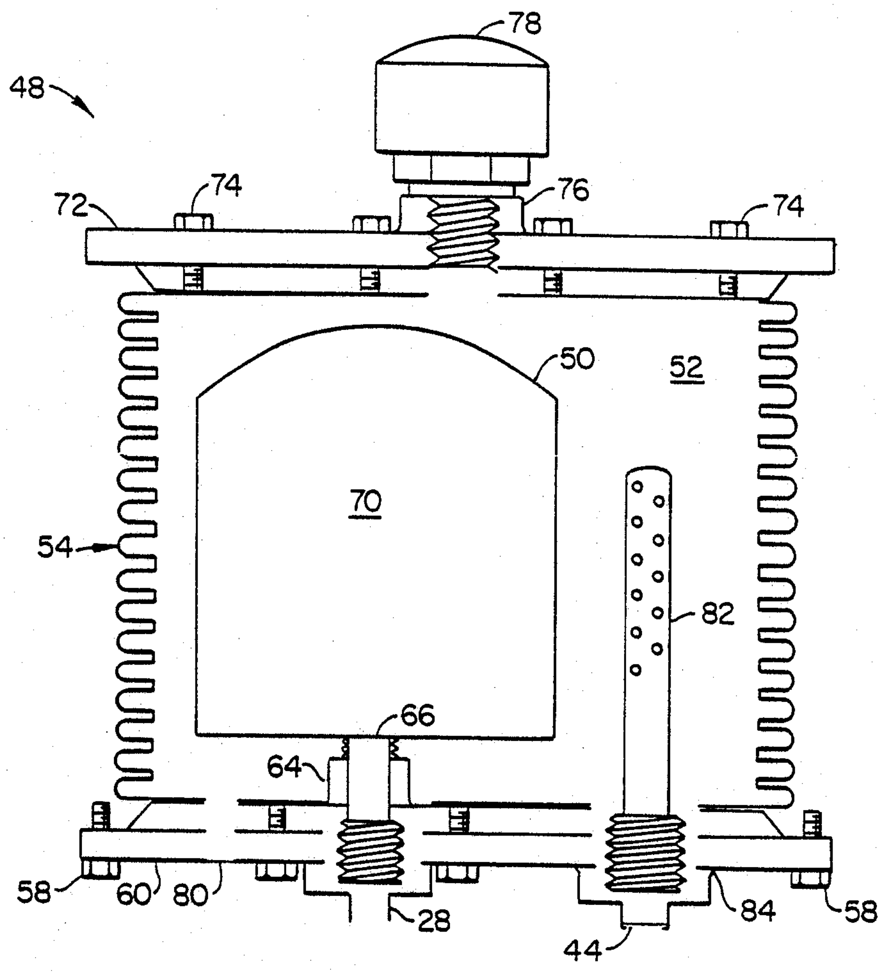

FIG. 1 is a typical hydrostatic system of the prior art for energizing a fixed displacement hydraulic motor; and FIG. 2 is a schematic view of a heat exchanger-filter apparatus of the present invention which replaces certain of the elements of the prior art system of FIG. 1.

A prior art hydrostatic system using a variable pump-fixed motor configuraton is broadly denoted by the numeral 10 and is shown schematically in FIG. 1. System 10 includes a fixed displacement motor 12 coupled by a motor case drain line 16 and high pressure lines 18 and 20, lines 16, 18 and 20 being coupled to a variable displacement pump 22 which drives motor 12. Inlet line 24 and pump case drain line 26 are coupled to pump 22.

Line 24 is coupled to the outlet 28 of a filter 30 whose inlet 32 is coupled to the inlet 34 of a reservoir 36, the latter having an outlet 38 coupled by a line 40 to a heat exchanger 42. Line 26 is coupled to the drain outlet 44 of heat exchanger 42.

In use, pump 22 receives charge fluid from filter 30 and from reservoir 36. The fluid, when flowing through the system, first flows through charge pump 14 being piggy-back mounted to pump 22, through two check valves to fill the closed loop lines 18 and 20. When high pressure lines are full, there is a relief valve that vents oil to the case of pump 22. Leakage and cooling oil flows from motor 12 through lines 16 to combine with the charge pump oil in the case of pump 22 where it flows out of pump 22 to line 26 and to inlet 44 of the heat exchanger.

It has been found that filter 30, reservoir 36 and heat exchanger 42 can be simplified in construction by making them in a single apparatus 48 of the type shown in FIG. 2 wherein a cylindrical filter 50 is mounted within the internal space 52 of a bellows 54 having a corrugated side wall 56 mounted by bolts 58 on a base plate 60 having three port holes therethrough coupled with base plate fitting 44. Return oil from pump case 22, through line 26 (FIG. 1) can enter the apparatus through ports 84, through diffuser 82, into space 52 where the oil flows around filter housing 50 and up through the base of the filter.

Filter 50 may be of any suitable construction. For purposes of illustration, it comprises an SE-10 micron filter which has a porous side wall 70 through which hydraulic fluid passes from space 52 into and through the filter and then through the outlet 66 of the filter to fluid line 24 (FIG. 1).

The base plate has a drain hole 89 to drain space 52 when full of oil for saving filters 50 when needed.

Bellows 54 is coupled at its upper end to a top plate 72 by bolts 74, top plate 72 having a check valve port 76 which is provided with a relief pressure cap 78 set at a particular pressure, such as 10 psi. Cap 78 also has an air filter vacuum breaker in case there is a vacuum in space 52. Space 52 is to be completely full of oil and as the oil temperature starts to heat up, the corrugated side wall 54 will expand to accomodate the increased volume in space 52.

The expandability and increased area of the corrugated wall 54 provides for a heat exchange capability in the sense that the bellows has increased area for heat dissipation. Thus, apparatus 48 provides a sealed hydraulic expansion reservoir with integral filter assembly which is simple and rugged in construction, is expensive to produce and maintain, and represents a considerable savings in capital costs and space required for operating the variable displacement pump 22 as well as hydraulic motor 12. The apparatus therefore exchanges heat, expands, filters oils, diffuses oils and defines a reservoir that is sealed. This unit can be used by mining, agricultural, construction, marine and other markets around the world.

We claim:

1. A combination fluid heat exchanger and filter apparatus comprising:

an expandable bellows having means defining a closed, fluid receiving space, there being a fluid inlet and a fluid outlet communicating with the space, the bellows having an outer surface adapted to be normally exposed to the atmosphere in heat exchange relationship thereto; and a diffuser and filter within the space and across said inlet and said outlet, whereby fluid entering the space from the inlet thereof will pass through the diffuser and filter as it moves to the outlet, said bellows being expandable in response to the temperature of the fluid to thereby cause an increase in the volume of the space to present a heat exchange relationship between the bellows and the fluid.

2. Apparatus as set forth in claim 1, wherein is included means coupled with the space for preventing overpressure of the fluid in the space.

3. Apparatus as set forth in claim 2, wherein said preventing means includes an outlet port coupled with said space, and a pressure relief cap covering said outlet port, said cap having pressure relief means set to a predetermined relief pressure.

4. Apparatus as set forth in claim 1, wherein said bellows has a pair of opposed ends, there being a plate at each end, respectively, of the bellows the inlet and outlet extending through one of the plates.

5. Apparatus as set forth in claim 4, wherein said bellows has a central axis and the filter is between the plates and extends longitudinally of the central axis of the bellows.

6. Apparatus as set forth in claim 5, wherein the filter is cylindrical and has a central axis extending generally parallel to the central axis of the bellows.

7. Apparatus as set forth in claim 1, wherein is included a base plate, and an elongated fitting for coupling the filter to the base plate, one end of the fitting being coupled to the base plate and the other end of the fitting being coupled to the filter, whereby the filter is spaced from the base plate.

8. Apparatus as set forth in claim 7, wherein said base plate has a drain hole therein, and a drain plug for closing said drain hole.

* * * * *